United States Patent
Buckley et al.

(10) Patent No.: US 9,363,141 B1
(45) Date of Patent: Jun. 7, 2016

(54) SYSTEM AND METHOD FOR PARTITIONING A NETWORK

(71) Applicant: EMC Corporation, Hopkinton, MA (US)

(72) Inventors: Donagh Buckley, Banteer (IE); David Cohen, Hull, MA (US); Qing Ye, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 90 days.

(21) Appl. No.: 14/042,180

(22) Filed: Sep. 30, 2013

(51) Int. Cl.
*H04L 12/24* (2006.01)

(52) U.S. Cl.
CPC .................................. *H04L 41/0893* (2013.01)

(58) Field of Classification Search
CPC ... H04L 45/02; H04L 12/2801; H04W 80/04; G06F 8/63; G06F 9/5061
See application file for complete search history.

(56) References Cited

U.S. PATENT DOCUMENTS 8,713,135 B1 * 4/2014 Adogla et al. ................ 709/220

* cited by examiner

*Primary Examiner* — Chandrahas Patel
(74) *Attorney, Agent, or Firm* — Brian J. Colandreo; Mark H. Whittenberger; Holland & Knight LLP (57) ABSTRACT

A method and computer program product for defining a first subnet for a first end portion of a physical network. The first subnet includes: a first NIC IP address, a first gateway IP address, and a first logical path connecting the first NIC IP address and the first gateway IP address. A second subnet is defined for a second end portion of the physical network. The second subnet includes: a second NIC IP address, a second gateway IP address, and a second logical path connecting the second NIC IP address and the second gateway IP address. A supernet is defined for a central portion of the physical network. The first subnet is coupled to the second subnet via the supernet to enable point-to-point routing of data through the physical network.

22 Claims, 5 Drawing Sheets

SYSTEM AND METHOD FOR PARTITIONING A NETWORK

TECHNICAL FIELD

This disclosure relates to networks and, more particularly, to systems and methods for partitioning networks.

BACKGROUND

The distribution and storage of electronic content is of paramount importance in modern business. Accordingly, various systems may be employed to distribute and store such electronic content.

Networks may be utilized to distribute electronic content between various computing devices that may generate, store and process such electronic content. Often these networks are partitioned so that they may be used by multiple users/clients. Unfortunately, such partitioning of networks is often a complex task that may not be easily/quickly reconfigurable.

SUMMARY OF DISCLOSURE

In one implementation, a computer-implemented method includes defining a first subnet for a first end portion of a physical network. The first subnet includes: a first NIC IP address, a first gateway IP address, and a first logical path connecting the first NIC IP address and the first gateway IP address. A second subnet is defined for a second end portion of the physical network. The second subnet includes: a second NIC IP address, a second gateway IP address, and a second logical path connecting the second NIC IP address and the second gateway IP address. A supernet is defined for a central portion of the physical network. The first subnet is coupled to the second subnet via the supernet to enable point-to-point routing of data through the physical network.

One or more of the following features may be included. The first subnet and the second subnet may be included within a first logical portion of the physical network. A third subnet and a fourth subnet may be included within a second logical portion of the physical network.

The first end portion of the physical network may include a first network interface card having a first physical MAC address. The first NIC IP address may be tied to a first virtual MAC address that is associated with the first physical MAC address of the first network interface card. The first gateway IP address may be tied to a first network device included within the first end portion of the physical network. An additional subnet may be defined for the first end portion of the physical network, wherein the additional subnet of the first end portion of the physical network may include: an additional NIC IP address, an additional gateway IP address, and an additional logical path connecting the additional NIC IP address and the additional gateway IP address. The additional subnet of the first end portion of the physical network may be coupled to the supernet to enable enhanced point-to-point routing of data through the additional logical path. The additional NIC IP address may be tied to an additional virtual MAC address that is associated with the first physical MAC address of the first network interface card included within the first end portion of the physical network. The additional gateway IP address may be tied to a first network device included within the first end portion of the physical network.

The second end portion of the physical network may include a second network interface card having a second physical MAC address. The second NIC IP address may be tied to a second virtual MAC address that is associated with the second physical MAC address of the second network interface card. The second gateway IP address may be tied to a second network device included within the second end portion of the physical network. An additional subnet may be defined for the second end portion of the physical network, wherein the additional subnet of the second end portion of the physical network may include: an additional NIC IP address, an additional gateway IP address, and an additional logical path connecting the additional NIC IP address and the additional gateway IP address. The additional subnet of the second end portion of the physical network may be coupled to the supernet to enable enhanced point-to-point routing of data through the additional logical path. The additional NIC IP address may be tied to an additional virtual MAC address that is associated with the second physical MAC address of the second network interface card included within the second end portion of the physical network. The additional gateway IP address may be tied to a second network device included within the second end portion of the physical network.

In another implementation, a computer program product resides on a computer readable medium and has a plurality of instructions stored on it. When executed by a processor, the instructions cause the processor to perform operations including defining a first subnet for a first end portion of a physical network. The first subnet includes: a first NIC IP address, a first gateway IP address, and a first logical path connecting the first NIC IP address and the first gateway IP address. A second subnet is defined for a second end portion of the physical network. The second subnet includes: a second NIC IP address, a second gateway IP address, and a second logical path connecting the second NIC IP address and the second gateway IP address. A supernet is defined for a central portion of the physical network. The first subnet is coupled to the second subnet via the supernet to enable point-to-point routing of data through the physical network.

One or more of the following features may be included. The first subnet and the second subnet may be included within a first logical portion of the physical network. A third subnet and a fourth subnet may be included within a second logical portion of the physical network.

The first end portion of the physical network may include a first network interface card having a first physical MAC address. The first NIC IP address may be tied to a first virtual MAC address that is associated with the first physical MAC address of the first network interface card. The first gateway IP address may be tied to a first network device included within the first end portion of the physical network. An additional subnet may be defined for the first end portion of the physical network, wherein the additional subnet of the first end portion of the physical network may include: an additional NIC IP address, an additional gateway IP address, and an additional logical path connecting the additional NIC IP address and the additional gateway IP address. The additional subnet of the first end portion of the physical network may be coupled to the supernet to enable enhanced point-to-point routing of data through the additional logical path. The additional NIC IP address may be tied to an additional virtual MAC address that is associated with the first physical MAC address of the first network interface card included within the first end portion of the physical network. The additional gateway IP address may be tied to a first network device included within the first end portion of the physical network.

The second end portion of the physical network may include a second network interface card having a second physical MAC address. The second NIC IP address may be tied to a second virtual MAC address that is associated with the second physical MAC address of the second network interface card. The second gateway IP address may be tied to a second network device included within the second end portion of the physical network. An additional subnet may be defined for the second end portion of the physical network, wherein the additional subnet of the second end portion of the physical network may include: an additional NIC IP address, an additional gateway IP address, and an additional logical path connecting the additional NIC IP address and the additional gateway IP address. The additional subnet of the second end portion of the physical network may be coupled to the supernet to enable enhanced point-to-point routing of data through the additional logical path. The additional NIC IP address may be tied to an additional virtual MAC address that is associated with the second physical MAC address of the second network interface card included within the second end portion of the physical network. The additional gateway IP address may be tied to a second network device included within the second end portion of the physical network.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
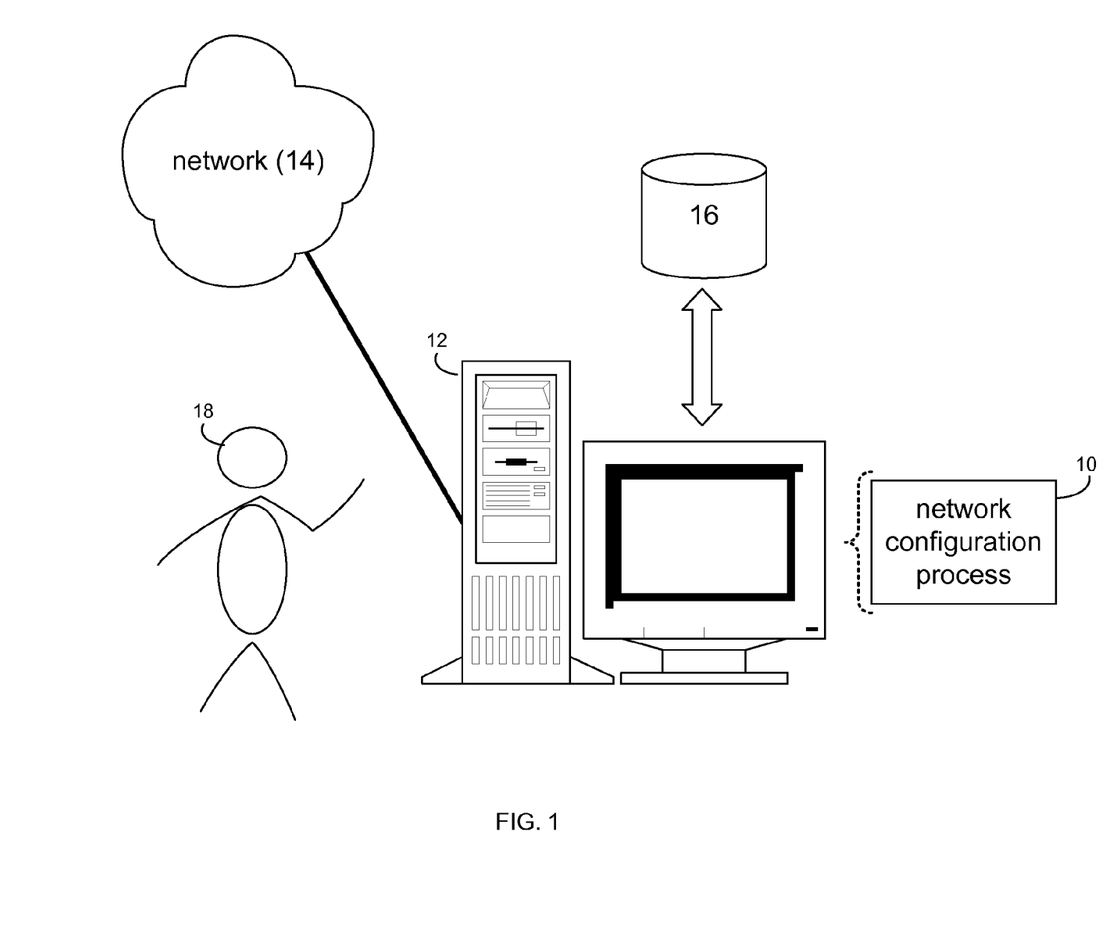
FIG. 1 is a diagrammatic view of a computing device executing a network configuration process in accordance with this disclosure.

System Overview:

Referring to FIG. 1, there is shown network configuration process 10 that may reside on and may be executed by computing device 12, which may be connected to network 14 (e.g., the Internet, a local area network, a wide area network).

The instruction sets and subroutines of network configuration process 10, which may be stored on storage device 16 coupled to computing device 12, may be executed by one or more processors (not shown) and one or more memory architectures (not shown) included within computing device 12. Examples of storage device 16 may include but is not limited to: a hard disk drive; a tape drive; an optical drive; a RAID device; a random access memory (RAM); a read-only memory (ROM); and all forms of flash memory storage devices. As will be discussed below in greater detail, network configuration process 10 may be utilized (by user 18) to administer and configure network 14.

Figure 2:
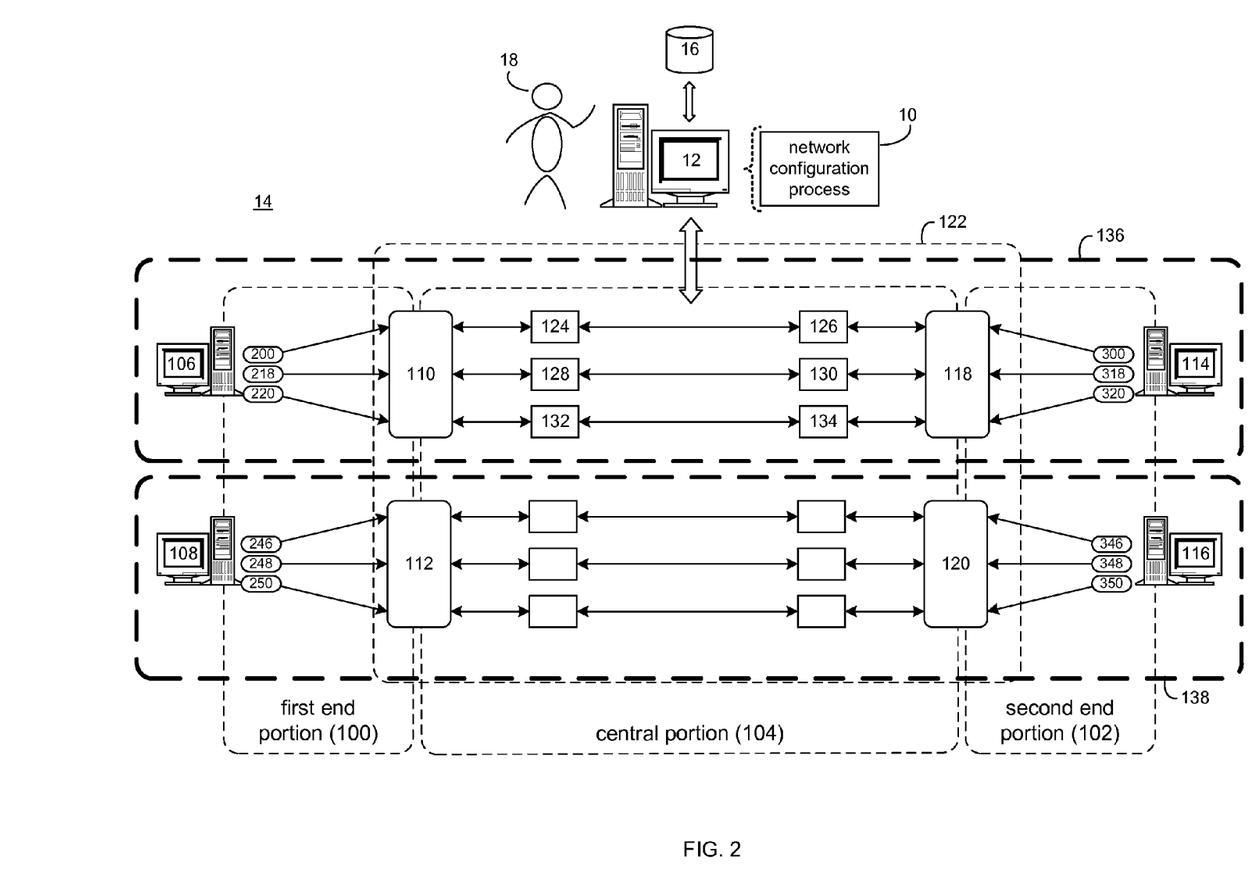
FIG. 2 is a diagrammatic view of a network and the computing device of FIG. 1.

Referring also to FIG. 2, there is shown a diagrammatic view of network 14. Network 14 may include first end portion 100, second end portion 102 and central portion 104.

For this illustrative example, first end portion 100 of network 14 may be interpreted as a first edge of network 14, wherein first end portion 100 may include one or more computing devices (e.g., computing devices 106, 108) that may be coupled to network 14, examples of which may include but are not limited to data server computers, backup server computers, application server computers, clusters of data server computers, clusters of backup server computers, and clusters of application server computers. First end portion 100 may also include one or more network devices (e.g., network devices 110, 112) that may be configured for coupling computing devices 106, 108 to central portion 104 of network 14.

While first end portion 100 is shown to include only two computing devices (e.g., computing devices 106, 108), this is for illustrative purposes only and is not intended to be a limitation of this disclosure, as other configurations are possible and are considered to be within the scope of this disclosure. While first end portion 100 is shown to include only two network devices (e.g., network devices 110, 112), this is for illustrative purposes only and is not intended to be a limitation of this disclosure, as other configurations are possible and are considered to be within the scope of this disclosure.

For this illustrative example, second end portion 102 of network 14 may be interpreted as a second edge of network 14, wherein second end portion 102 may include one or more computing devices (e.g., computing devices 114, 116) that may be coupled to network 14, examples of which may include but are not limited to data server computers, backup server computers, application server computers, clusters of data server computers, clusters of backup server computers, and clusters of application server computers. Second end portion 102 may also include one or more network devices (e.g., network devices 118, 120) that may be configured for coupling computing devices 114, 116 to central portion 104 of network 14.

While second end portion 102 is shown to include only two computing devices (e.g., computing devices 114, 116), this is for illustrative purposes only and is not intended to be a limitation of this disclosure, as other configurations are possible and are considered to be within the scope of this disclosure. While second end portion 102 is shown to include only two network devices (e.g., network devices 118, 120), this is for illustrative purposes only and is not intended to be a limitation of this disclosure, as other configurations are possible and are considered to be within the scope of this disclosure.

As discussed above, network 14 may include first end portion 100, second end portion 102 and central portion 104. Through the use of network configuration process 10, user 18 may configure a virtual overlay that resides on top of network 14 that may allow the resources of network 14 to be partitioned amongst various users of network 14.

Figure 3:
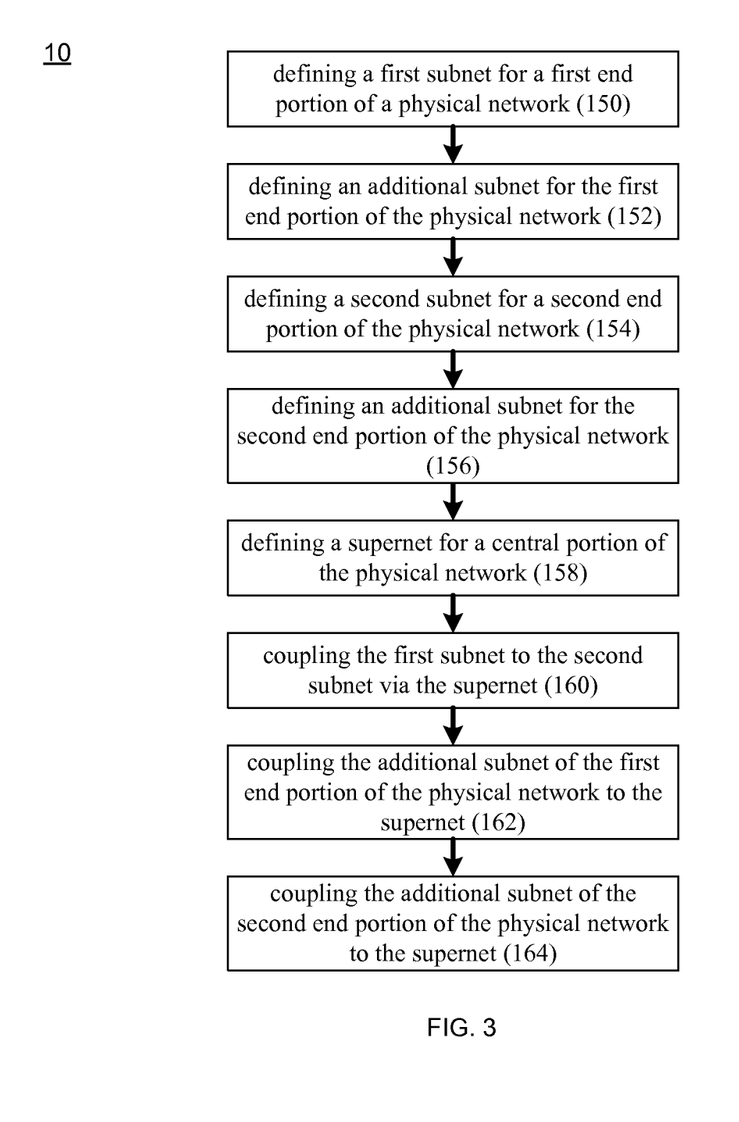
FIG. 3 is a flow chart of the network configuration process of FIG. 1.
Figure 4:
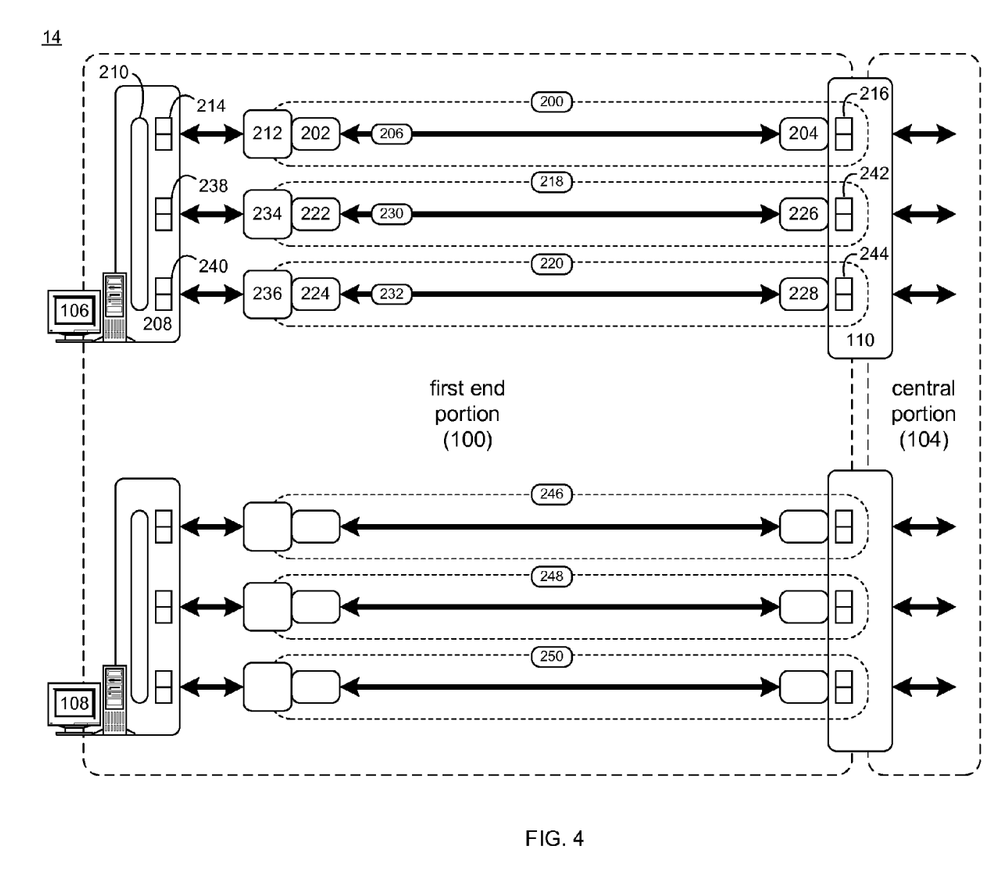
FIG. 4 is a diagrammatic view of a first end portion of the network of FIG. 2.

The Network Configuration Process:

Referring also to FIGS. 3-4, network configuration process 10 may define 150 a first subnet (e.g., first subnet 200) for first end portion 100 of a physical network (e.g., network 14), wherein the first subnet (e.g., first subnet 200) may include: first NIC IP address 202, first gateway IP address 204, and first logical path 206 connecting first NIC IP address 202 and first gateway IP address 204.

First end portion 100 of the physical network (e.g., network 14) may include first network interface card 208 (included within computing device 106) that may have a first physical MAC address (e.g., first physical MAC address 210). Subnet 200 may be configured as/bound to a Virtual LAN (i.e., a VLAN), wherein the first physical MAC address (e.g., first physical MAC address 210) of first network interface card 208 may be associated with a first virtual MAC address (e.g., first virtual MAC address 212) of subnet 200 (which is configured as/bound to a VLAN), wherein first virtual MAC address 212 may be tied to first NIC IP address 202. Further, the first gateway IP address (e.g., first gateway IP address

204) may be tied to a first network device (e.g., network device 110) included within first end portion 100 of the physical network (e.g., network 14). Accordingly and through the use of such a configuration, IP-level routing may be achievable within subnet 200 through the use of first NIC IP address 202, first gateway IP address 204 and first logical path 206 connecting first NIC IP address 202 and first gateway IP address 204.

The quantity of data (e.g., the bandwidth) of subnet 200 may be configurable through network configuration process 10. Specifically, network configuration process 10 may allow user 18 to define the rate at which data (e.g., data packets) may pass through either first network interface card 208 or network device 110 by controlling the rate at which RX/TX buffers 214 included within first network interface card 208 and/or RX/TX buffers 216 included within network device 110 process such data packets. First logical path 206 within subnet 200 may be associated with RX/TX buffers 214, 216, wherein controlling the rate at which RX/TX buffers 214, 216 process data packets controls the bandwidth of logical path 206. Accordingly and through the use of network configuration process 10, the bandwidth of logical path 206 within subnet 200 may be increased or decreased to regulate the level of access that e.g., computing device 106 has to network 14.

In the event that additional bandwidth is needed by computing device 106, user 18 may use network configuration process 10 to configure additional subnets. Accordingly, network configuration process 10 may define 152 one or more additional subnets (e.g., subnets 218, 220) for first end portion 100 of the physical network (e.g., network 14), wherein the additional subnets (e.g., subnets 218, 220) of first end portion 100 of network 14 may include: additional NIC IP addresses 222, 224, additional gateway IP addresses 226, 228, and additional logical paths 230, 232 connecting additional NIC IP address 222, 224 and additional gateway IP address 226, 228 (respectively).

Subnets 218, 220 may be configured as/bound to VLANs, wherein the first physical MAC address (e.g., first physical MAC address 210) of first network interface card 208 may be associated with virtual MAC addresses (e.g., virtual MAC addresses 234, 236) of subnets 218, 220 (respectively, which are configured as/bound to VLANs), wherein virtual MAC addresses 234, 236 may be tied to NIC IP addresses 222, 224 (respectively). Further, gateway IP address 226, 228 may be tied to the first network device (e.g., network device 110) included within first end portion 100 of the physical network (e.g., network 14). As discussed above and through the use of such a configuration, IP-level routing may be achievable within subnets 218, 220 through the use of NIC IP addresses 222, 224, gateway IP addresses 226, 228 and logical paths 230, 232 connecting NIC IP address 222, 224 and gateway IP addresses 226, 228.

In the manner described above, the quantity of data (e.g., the bandwidth) of subnets 218, 220 may be configurable through network configuration process 10 and may allow user 18 to define the rate at which data (e.g., data packets) may pass through either first network interface card 208 or network device 110 by controlling the rate at which RX/TX buffers 238, 240 included within first network interface card 208 and/or RX/TX buffers 242, 244 included within network device 110 process such data packets. Accordingly, logical path 230 within subnet 218 may be associated with RX/TX buffers 238, 242, wherein controlling the rate at which RX/TX buffers 238, 242 process data packets controls the bandwidth of logical path 230. Further, logical path 232 within subnet 220 may be associated with RX/TX buffers 240, 244, wherein controlling the rate at which RX/TX buffers 240, 244 process data packets controls the bandwidth of logical path 232. Accordingly and through the use of network configuration process 10, the bandwidth of logical paths 230, 232 within subnets 218, 220 (respectively) may be increased or decreased to regulate the level of access that e.g., computing device 106 has to network 14.

Figure 5:
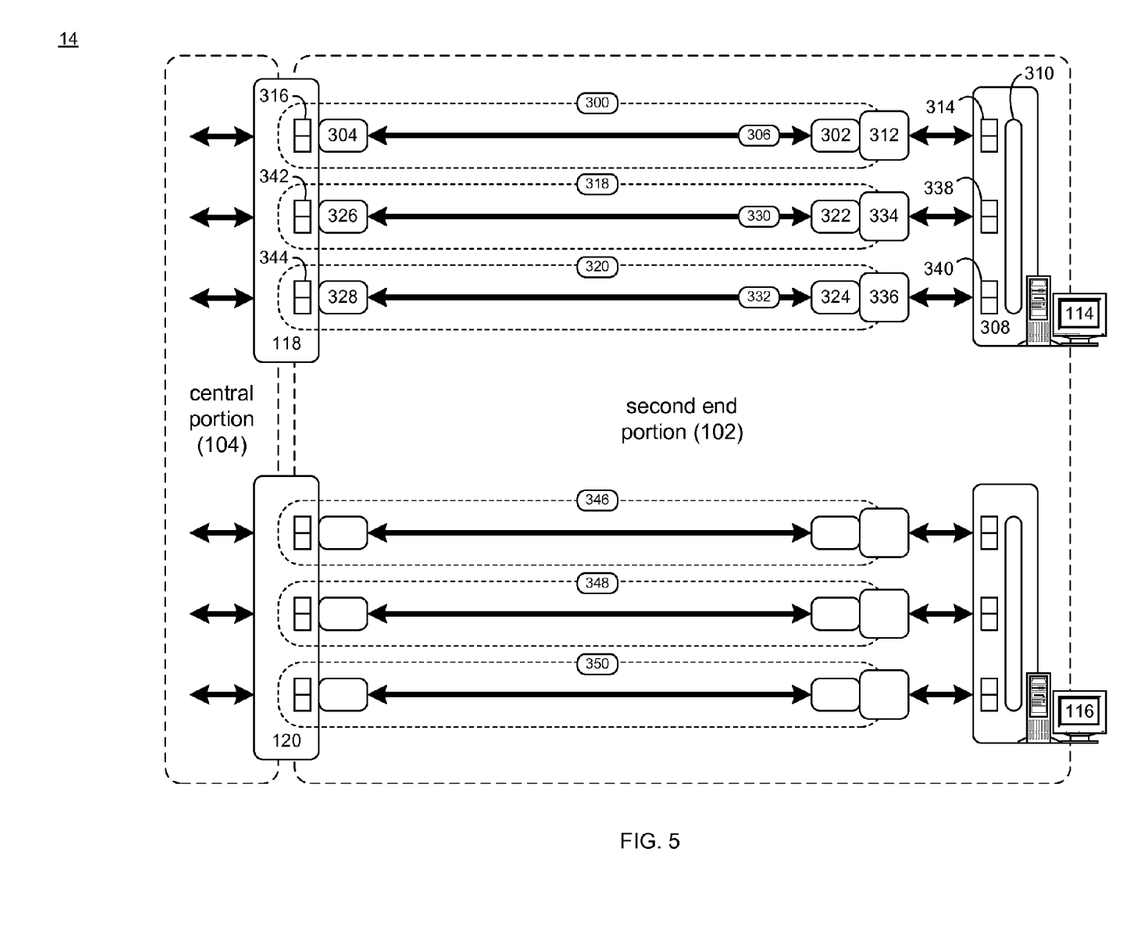
FIG. 5 is a diagrammatic view of a second end portion of the network of FIG. 2.

Referring also to FIG. 5, network configuration process 10 may define 154 a second subnet (e.g., second subnet 300) for second end portion 102 of the physical network (e.g., network 14), wherein the second subnet (e.g., second subnet 300) includes: second NIC IP address 302, second gateway IP address 304, and second logical path 306 connecting second NIC IP address 302 and second gateway IP address 304.

Second end portion 102 of the physical network (e.g., network 14) may include second network interface card 308 (included within computing device 114) that may have a second physical MAC address (e.g., second MAC address 310). Subnet 300 may be configured as/bound to a Virtual LAN (i.e., a VLAN), wherein the second physical MAC address (e.g., second physical MAC address 310) of second network interface card 308 may be associated with a second virtual MAC address (e.g., second virtual MAC address 312) of subnet 300 (which is configured as/bound to a VLAN), wherein second virtual MAC address 312 may be tied to second NIC IP address 302. Further, the second gateway IP address (e.g., second gateway IP address 304) may be tied to a second network device (e.g., network device 118) included within second end portion 102 of the physical network (e.g., network 14). Accordingly and through the use of such a configuration, IP-level routing may be achievable within subnet 300 through the use of second NIC IP address 302, second gateway IP address 304 and second logical path 306 connecting second NIC IP address 302 and second gateway IP address 304.

The quantity of data (e.g., the bandwidth) of subnet 300 may be configurable through network configuration process 10. Specifically, network configuration process 10 may allow user 18 to define the rate at which data (e.g., data packets) may pass through either second network interface card 308 or network device 118 by controlling the rate at which RX/TX buffers 314 included within second network interface card 308 and/or RX/TX buffers 316 included within network device 118 process such data packets. Second logical path 306 within subnet 300 may be associated with RX/TX buffers 314, 316, wherein controlling the rate at which RX/TX buffers 314, 316 process data packets controls the bandwidth of logical path 306. Accordingly and through the use of network configuration process 10, the bandwidth of logical path 306 within subnet 300 may be increased or decreased to regulate the level of access that e.g., computing device 114 has to network 14.

In the event that additional bandwidth is needed by computing device 114, user 18 may use network configuration process 10 to configure additional subnets. Accordingly, network configuration process 10 may define 156 one or more additional subnets (e.g., subnets 318, 320) for second end portion 102 of the physical network (e.g., network 14), wherein the additional subnets (e.g., subnets 318, 320) of second end portion 102 of network 14 may include: additional NIC IP addresses 322, 324, additional gateway IP addresses 326, 328, and additional logical paths 330, 332 connecting additional NIC IP address 322, 324 and additional gateway IP address 326, 328 (respectively).

Subnets 318, 320 may be configured as/bound to VLANs, wherein the second physical MAC address (e.g., second physical MAC address 310) of second network interface card 308 may be associated with virtual MAC addresses (e.g., virtual MAC addresses 334, 336) of subnets 318, 320 (respectively, which are configured as/bound to VLANs), wherein virtual MAC addresses 334, 336 may be tied to NIC IP addresses 322, 324 (respectively). Further, gateway IP address 326, 328 may be tied to the second network device (e.g., network device 118) included within second end portion 102 of the physical network (e.g., network 14). As discussed above and through the use of such a configuration, IP-level routing may be achievable within subnets 318, 320 through the use of NIC IP addresses 322, 324, gateway IP addresses 326, 328 and logical paths 330, 332 connecting NIC IP address 322, 324 and gateway IP addresses 326, 328.

In the manner described above, the quantity of data (e.g., the bandwidth) of subnets 318, 320 may be configurable through network configuration process 10 and may allow user 18 to define the rate at which data (e.g., data packets) may pass through either second network interface card 308 or network device 118 by controlling the rate at which RX/TX buffers 338, 340 included within second network interface card 308 and/or RX/TX buffers 342, 344 included within network device 118 process such data packets. Accordingly, logical path 330 within subnet 318 may be associated with RX/TX buffers 338, 342, wherein controlling the rate at which RX/TX buffers 338, 342 process data packets controls the bandwidth of logical path 330. Further, logical path 332 within subnet 320 may be associated with RX/TX buffers 340, 344, wherein controlling the rate at which RX/TX buffers 340, 344 process data packets controls the bandwidth of logical path 332. Accordingly and through the use of network configuration process 10, the bandwidth of logical paths 330, 332 within subnets 318, 320 (respectively) may be increased or decreased to regulate the level of access that e.g., computing device 114 has to network 14.

Referring again to FIG. 2, network configuration process 10 may define 158 a supernet (e.g., supernet 122) for central portion 104 of the physical network (e.g., network 14). Supernet 122 may be configured as a standard IP network and may include a plurality of IP-addressable and IP-routable network devices (e.g., network devices 124, 126, 128, 130, 132, 134). While supernet 122 is shown to include six network devices, this is for illustrative purposes only and is not intended to be a limitation of this disclosure, as other configurations are possible.

Network configuration process 10 may couple 160 the first subnet (e.g., first subnet 200) to the second subnet (e.g., second subnet 300) via supernet 122 to enable point-to-point routing of data through the physical network (e.g., network 14). For example, network configuration process 10 may enable point-to-point routing of data through network 14 and couple 160 first subnet 200 to second subnet 300 by defining (through supernet 122) a routing path (using the appropriate IP address) of network device 110←→network device 124←→network device 126←→network device 118.

Further, network configuration process 10 may couple 162 additional subnets 218, 220 of first end portion 100 of network 14 to supernet 122 and may couple 164 additional subnets 318, 320 of second end portion 102 of network 14 to supernet 122. Accordingly, enhanced point-to-point routing of data through network 14 may be enabled (through the use of subnets 218, 318 and/or subnets 220, 320) when additional network bandwidth is required between (in this example) computing device 106 and computing device 114. In such a situation, network configuration process 10 may define (through supernet 122) a routing path (using the appropriate IP address) of network device 110←→network device 128←→network device 130←→network device 118 (thus connecting subnets 218, 318) and/or a routing path (using the appropriate IP address) of network device 110←→network device 132←→network device 134←→network device 118 (thus connecting subnets 220, 320).

Due to the above-described flexibility, network configuration process 10 may enable user 18 to partition the resources of network 14 amongst a plurality of users/devices. For example, network 14 may be partitioned into a plurality of logical portions (or network slices). Therefore, computing devices 106, 114 and subnets 200, 218, 220 (of first end portion 100), and subnets 300, 318, 320 (of second end portion 102) may be included in first network slice 136, wherein other computing devices (e.g., computing devices 108, 116) and other subnets (e.g., subnets 246, 248, 250 of first end portion 100; and subnets 346, 348, 350 of second subnet 102) may be included in second network slice 138.

Accordingly, network configuration process 10 may enable user 18 to partition the resources of network 14 amongst network slices 136, 138 by increasing or decreases the number of subnets in these networks slice and the number of paths routed paths there between. Accordingly, in the event that network slice 136 needs additional bandwidth, network configuration process 10 may disable a pair of subnets (and the connecting network path) for e.g., first network slice 138 and may define a new pair of subnets (and a new connecting path) within second network slice 136.

While, in this example, network 14 is shown to include two network slices (namely first network slice 136 and second network slice 138), this is for illustrative purposes only and is not intended to be a limitation of this disclosure, as other configurations are possible.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/ special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:

defining a first subnet for a first end portion of a physical network, wherein the first subnet includes: a first NIC IP address, a first gateway IP address, and a first logical path connecting the first NIC IP address and the first gateway IP address, wherein the first end portion includes at least two computing devices, wherein the first logical path includes one or more RX/TX buffers;

configuring the one or more RX/TX buffers of the first logical path to define a bandwidth of the first logical path;

defining a second subnet for a second end portion of the physical network, wherein the second subnet includes: a second NIC IP address, a second gateway IP address, and a second logical path connecting the second NIC IP address and the second gateway IP address, wherein the second end portion includes at least two computing devices, wherein the second logical path includes one or more RX/TX buffers;

configuring the one or more RX/TX buffers of the second logical path to define a bandwidth of the second logical path;

defining a supernet for a central portion of the physical network; and coupling the first subnet to the second subnet via the supernet to enable point-to-point routing of data through the physical network.

2. The computer-implemented method of claim 1 wherein the first subnet and the second subnet are included within a first logical portion of the physical network.

3. The computer-implemented method of claim 2 wherein a third subnet and a fourth subnet are included within a second logical portion of the physical network.

4. The computer-implemented method of claim 1 wherein the first end portion of the physical network includes a first network interface card having a first physical MAC address.

5. The computer-implemented method of claim 4 wherein:
the first NIC IP address is tied to a first virtual MAC address that is associated with the first physical MAC address of the first network interface card; and
the first gateway IP address is tied to a first network device included within the first end portion of the physical network.

6. The computer-implemented method of claim 4 further comprising:
defining an additional subnet for the first end portion of the physical network, wherein the additional subnet of the first end portion of the physical network includes:
an additional NIC IP address,
an additional gateway IP address, and
an additional logical path connecting the additional NIC IP address and the additional gateway IP address; and
coupling the additional subnet of the first end portion of the physical network to the supernet to enable enhanced point-to-point routing of data through the additional logical path.

7. The computer-implemented method of claim 6 wherein:
the additional NIC IP address is tied to an additional virtual MAC address that is associated with the first physical MAC address of the first network interface card included within the first end portion of the physical network; and
the additional gateway IP address is tied to a first network device included within the first end portion of the physical network.

8. The computer-implemented method of claim 1 wherein the second end portion of the physical network includes a second network interface card having a second physical MAC address.

9. The computer-implemented method of claim 8 wherein:
the second NIC IP address is tied to a second virtual MAC address that is associated with the second physical MAC address of the second network interface card; and
the second gateway IP address is tied to a second network device included within the second end portion of the physical network.

10. The computer-implemented method of claim 8 further comprising:
defining an additional subnet for the second end portion of the physical network, wherein the additional subnet of the second end portion of the physical network includes:
an additional NIC IP address,
an additional gateway IP address, and
an additional logical path connecting the additional NIC IP address and the additional gateway IP address; and
coupling the additional subnet of the second end portion of the physical network to the supernet to enable enhanced point-to-point routing of data through the additional logical path.

11. The computer-implemented method of claim 10 wherein:
the additional NIC IP address is tied to an additional virtual MAC address that is associated with the second physical MAC address of the second network interface card included within the second end portion of the physical network; and
the additional gateway IP address is tied to a second network device included within the second end portion of the physical network.

12. A computer program product residing on a non-transitory computer readable medium having a plurality of instructions stored thereon which, when executed by a processor, cause the processor to perform operations comprising:
defining a first subnet for a first end portion of a physical network, wherein the first subnet includes: a first NIC IP address, a first gateway IP address, and a first logical path connecting the first NIC IP address and the first gateway IP address, wherein the first end portion includes at least two computing devices, wherein the first logical path includes one or more RX/TX buffers;
configuring the one or more RX/TX buffers of the first logical path to define a bandwidth of the first logical path;
defining a second subnet for a second end portion of the physical network, wherein the second subnet includes: a second NIC IP address, a second gateway IP address, and a second logical path connecting the second NIC IP address and the second gateway IP address, wherein the second end portion includes at least two computing devices, wherein the second logical path includes one or more RX/TX buffers;
configuring the one or more RX/TX buffers of the second logical path to define a bandwidth of the second logical path;
defining a supernet for a central portion of the physical network; and
coupling the first subnet to the second subnet via the supernet to enable point-to-point routing of data through the physical network.

13. The computer program product of claim 12 wherein the first subnet and the second subnet are included within a first logical portion of the physical network.

14. The computer program product of claim 13 wherein a third subnet and a fourth subnet are included within a second logical portion of the physical network.

15. The computer program product of claim 12 wherein the first end portion of the physical network includes a first network interface card having a first physical MAC address.

16. The computer program product of claim 15 wherein:
the first NIC IP address is tied to a first virtual MAC address that is associated with the first physical MAC address of the first network interface card; and
the first gateway IP address is tied to a first network device included within the first end portion of the physical network.

17. The computer program product of claim 15 further comprising instructions for:
defining an additional subnet for the first end portion of the physical network, wherein the additional subnet of the first end portion of the physical network includes:
an additional NIC IP address,
an additional gateway IP address, and
an additional logical path connecting the additional NIC IP address and the additional gateway IP address; and
coupling the additional subnet of the first end portion of the physical network to the supernet to enable enhanced point-to-point routing of data through the additional logical path.

18. The computer program product of claim 17 wherein:
the additional NIC IP address is tied to an additional virtual MAC address that is associated with the first physical MAC address of the first network interface card included within the first end portion of the physical network; and
the additional gateway IP address is tied to a first network device included within the first end portion of the physical network.

19. The computer program product of claim 12 wherein the second end portion of the physical network includes a second network interface card having a second physical MAC address.

20. The computer program product of claim 19 wherein:
the second NIC IP address is tied to a second virtual MAC address that is associated with the second physical MAC address of the second network interface card; and
the second gateway IP address is tied to a second network device included within the second end portion of the physical network.

21. The computer program product of claim 19 further comprising instructions for:
defining an additional subnet for the second end portion of the physical network, wherein the additional subnet of the second end portion of the physical network includes:
an additional NIC IP address,
an additional gateway IP address, and
an additional logical path connecting the additional NIC IP address and the additional gateway IP address; and
coupling the additional subnet of the second end portion of the physical network to the supernet to enable enhanced point-to-point routing of data through the additional logical path.

22. The computer program product of claim 21 wherein:
the additional NIC IP address is tied to an additional virtual MAC address that is associated with the second physical MAC address of the second network interface card included within the second end portion of the physical network; and
the additional gateway IP address is tied to a second network device included within the second end portion of the physical network.

* * * * *